United States Patent
Bishop

[15] 3,705,526
[45] Dec. 12, 1972

[54] ROTARY DIE CUTTING BLANKS

[72] Inventor: Thomas Desmond Bishop, Solihull, England

[73] Assignee: The Deritend Engineering Company Limited, Birmingham, England

[22] Filed: Oct. 26, 1970

[21] Appl. No.: 83,858

[30] Foreign Application Priority Data

Nov. 7, 1969 Great Britain..........54,569/69

[52] U.S. Cl. ..................83/698, 83/673, 93/58.2
[51] Int. Cl. ..........................B31b 1/20, B26d 7/26
[58] Field of Search..........83/698, 699, 663, 673.5; 93/58.2 R, 58.2, 82

[56] References Cited

UNITED STATES PATENTS

| | | |
|---|---|---|
| 3,119,312 | 1/1964 | Henc......................93/58.2 F |
| 3,527,123 | 9/1970 | Dovey......................83/698 X |
| 3,214,106 | 10/1965 | Gorman....................83/698 X |
| 3,008,366 | 11/1961 | Taylor......................83/698 X |
| 3,496,841 | 2/1970 | Kirby......................93/58.2 R |
| 3,277,756 | 10/1966 | Des Jardins..............83/698 X |
| 2,674,026 | 4/1954 | St. Palley................83/698 X |

*Primary Examiner*—Donald G. Kelly
*Attorney*—Marshall & Yeasting

[57] ABSTRACT

A die for rotary die-cutting of cardboard and similar materials which is of the type comprising a sheet metal forme to lie on the surface of the roller of the die-cutting machine, and with cutting rule supported on the forme by a number of studs, the security of the rule being improved by providing at least one of the studs with a rubber or plastic pad which is deformed on the stud so as to expand the pad radially of the stud and thus grip the rule.

5 Claims, 3 Drawing Figures

PATENTED DEC 12 1972 3,705,526

3,705,526

ROTARY DIE CUTTING BLANKS

BACKGROUND OF THE INVENTION

This invention relates to rotary die-cutting of blanks, for example of cardboard in the manufacture of boxes.

It is known to use a cutting rule having a sharpened edge, located edge-on to a sheet metal form which is attached to the male roll of a roll pair and to hold the rule in place by a series of studs individually welded to the form (for example by a capacitor discharge welding gun which fixes the base of each stud to the form). Various means have been devised for fixing the rule to the studs, but that most commonly employed has used slit studs and the rule has been locally notched in the vicinity of each stud, so that the rule sits on the form. While this method has proved satisfactory the present invention seeks to improve the manufacture of forms still further.

SUMMARY OF THE INVENTION

In accordance with the invention, a die for rotary die-cutting comprises a sheet metal form provided with at least one stud provided with a pad of deformable material and a length of rule lying between the pad and an abutment, the stud being adapted for deformation of its pad radially of the stud so as to clamp the rule between the deformed pad and abutment.

The abutment may be a plain stud, or another stud with a pad for example: usually the latter will be employed.

Preferably the studs are screw-threaded, and each provided with a pad in the form of a sleeve, and a nut having a domed or frusto-conical face is screwed down to axially compress and hence radially extend the pads.

Preferably the pads are parallelopiped blocks with a central axial bore, and made of a plastics material for example nylon.

The rule is not notched, when the invention is used, inasmuch as there is no obstacle to the rule seating on the form along its length. If desired the rule may be perforated so that as the pads are deformed the plastics material is forced into the perforations and this then locks the rule in place in addition to gripping it. While the labor and tool cost for perforating the rule may be similar to that for notching it, the perforated rule is more resistant to compressive loads in actual die-cutting due inter alia to the perforations being smaller than is necessary for notches (in any given size of studs).

Moreover, for extreme conditions of usage, the rule can be arranged to seat not on the form, but on the roll which supports the form; for example in circle cutting, the form may be cut to provide a circular aperture, and the rule located in that aperture, the margin of the form around the aperture supporting one of each pair of studs, and the circular piece removed from the aperture being located within the rule and supporting the other stud of each pair of studs, and by using perforations as mentioned and equally tightening all of the nuts the assembly will be clamped together. In this event the said circular piece may require to be trimmed so that its size is equal to that of the circular aperture less the rule thickness.

Many variations will be apparent to those skilled in the art: instead of using perforated rule, an additional stud located laterally of the rule may anchor a screw passed through the rule, or other forms of cross-pin may serve the same function; plain (flat faced) nuts may be employed with an intermediate washer for pad deformation; and the studs may be spin rivetted to hold the washers in pad deforming state instead of using nuts.

Where the pad comprises a sleeve through which the stud extends, the pad may be a square block of nylon or like bored eccentrically of its faces, so that the distance between the bore axis and the faces of the pad varies enabling the stud to be placed at varying distances from the rule, and hence the thickness of pad between the stud and rule will also vary.

Moreover, one pad may be an elongated strip, with studs at regular intervals therealong.

In accordance with another aspect of the invention a form for rotary die-cutting comprises a sheet of material adapted to be attached to a roll of a die cutter, provided with at least one pad of deformable material, a rule abutting said pad, and an abutment on the opposite side of said rule, and means being provided to deform said pad to grip the rule.

Hence in accordance with this other aspect of the invention the form need not be of sheet metal, and the pad deforming means need not be a stud. Thus, a saw-cut plywood form may be used, and one face of the cut may provide the abutment, the pads being located on the opposite side of the rule, and deformed by any convenient means.

In providing a rule for a long and narrow slot to be cut in the blanks, e.g. a hand-hole in a cardboard box, the loop of rule may embrace a solid abutment, and be clamped thereto by pads or strips of pads on both outer sides of the loop.

DESCRIPTION OF THE PREFERRED EMBODIMENTS

Figure 1:
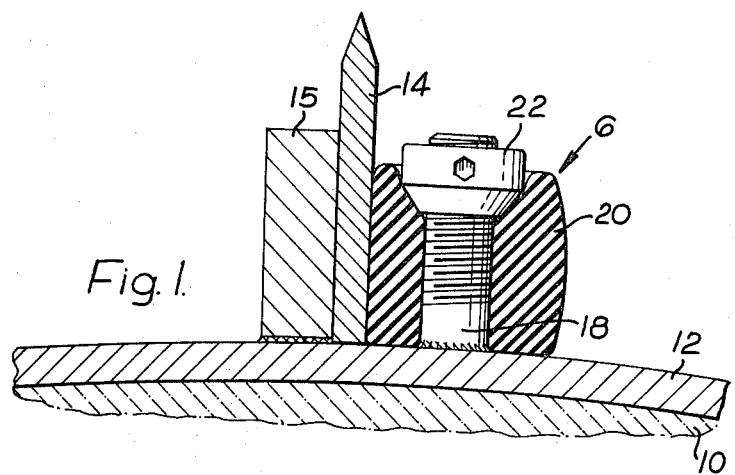
FIG. 1 shows a fragmentary sectional elevation of a form on a roll.
Figure 2:
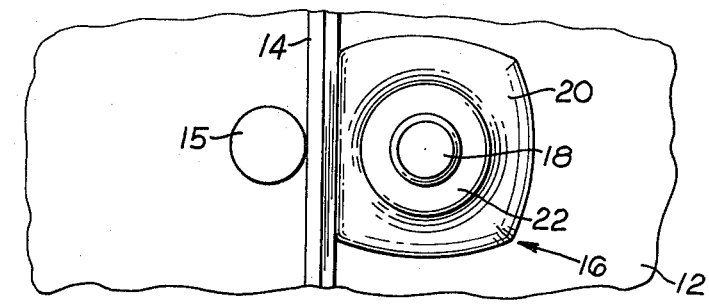
FIG. 2 is a plan view of the same.

Referring now to FIGS. 1 and 2, the roll surface 10 supports sheet-metal form 12 and rule 14 is located edge-on to the form, being located between a fixed abutment 15 and deformable abutment 16. Both abutments comprise studs welded to the form, but in one case the stud 18 supports and locates a block of yieldable and resilient material 20 such as nylon, hard rubber or the like. This stud 18 is screw threaded, and engaged by a nut 22 having a conical, hemi-spherical or like lower face so that when screwed down, the block - originally a cube or other parallelopiped with flat planar faces, is deformed and hence presses against the rule to clamp the same firmly to the fixed abutment. A second and lock nut may be provided, or other means to hold the nut 22 in compression of the block 20.

Figure 3:
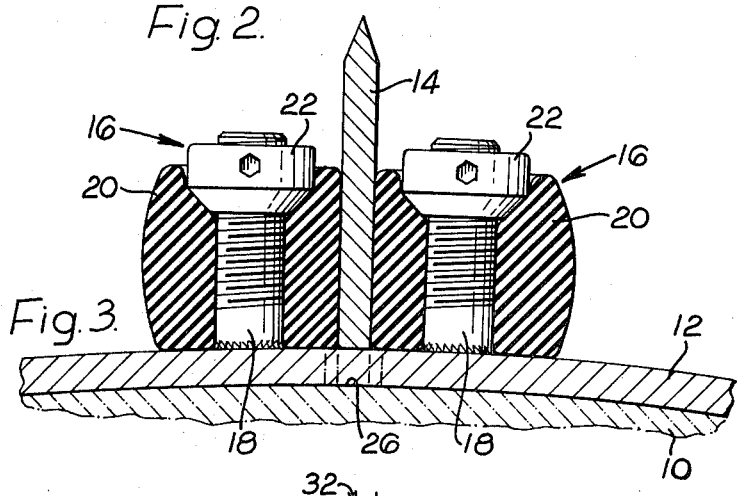
FIG. 3 is a similar fragmentary sectional elevation of a second form on a roll, showing in chain-dot lines, a modification.

Referring now to FIG. 3, the arrangement shown therein utilizes two abutments 16 between which the rule is clamped.

In the modification shown in chain-dot lines, the form is gapped to allow the rule to seat at 26 on the roll. This is advantageous for severe loading conditions.

Figure 4:
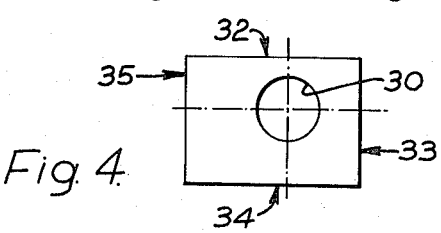
FIG. 4 is a plan view of a modified component capable of use within the arrangements shown.

FIG. 4 shows a block such as 20, in plan view, and the distance between the eccentric hole 30 for the stud and the side faces 32–35 is varied, so as to allow either the stud to be positioned at different distances from the rule, thus interposing more or less of the block between the stud and rule, or allowing the stud to be positioned at a fixed distance and the degree of compression and deformation of the block, and hence the grip on the rule, to be varied.

I claim:

1. A die for rotary die-cutting comprising a sheet metal form providing with an abutment, at least one stud which is spaced from the abutment and is provided with a pad of deformable material and a length of rule lying between the pad and the abutment, the stud being adapted for deformation of its pad radially of the stud so as to clamp the rule between the deformed pad and abutment.

2. A die for rotary die-cutting, as claimed in claim 1, wherein the rule is clamped between two studs and pads as aforesaid.

3. A die for rotary die-cutting, as claimed in claim 2, wherein each stud is screw-threaded and pad deformation is effected by screwing down nuts.

4. A form for rotary die-cutting comprising a sheet of material adapted to be attached to a roll of a die cutter, provided with at least one pad of deformable material, a rule abutting said pad, and an abutment on the opposite side of said rule, and means being provided to deform said pad to grip the rule.

5. A die for rotary die-cutting, as claimed in claim 1, wherein each stud is screw-threaded and pad deformation is effected by screwing down nuts.

* * * * *